United States Patent
Lee et al.

(10) Patent No.: US 9,411,399 B2
(45) Date of Patent: Aug. 9, 2016

(54) PORTABLE ELECTRONIC DEVICE AND METHOD OF PROVIDING REMAINING AMOUNT OF ELECTRIC POWER OF BATTERY IN PORTABLE ELECTRONIC DEVICE

(71) Applicant: Samsung Electronics Co., Ltd., Gyeonggi-do (KR)

(72) Inventors: Seung Ha Lee, Gyeongsangbuk-do (KR); Sung Hyup Lee, Gyeongsangbuk-do (KR); Soon Sang Park, Daegu (KR)

(73) Assignee: Samsung Electronics Co., Ltd (KR)

( * ) Notice: Subject to any disclaimer, the term of this patent is extended or adjusted under 35 U.S.C. 154(b) by 182 days.

(21) Appl. No.: 14/290,096

(22) Filed: May 29, 2014

(65) Prior Publication Data

US 2015/0002160 A1 Jan. 1, 2015

(30) Foreign Application Priority Data

Jun. 26, 2013 (KR) ........................ 10-2013-0073676

(51) Int. Cl.
*H01M 10/44* (2006.01)
*H01M 10/46* (2006.01)
*G06F 1/32* (2006.01)
*G06F 1/26* (2006.01)

(52) U.S. Cl.
CPC ................ *G06F 1/3212* (2013.01); *G06F 1/26* (2013.01); *Y02B 60/1292* (2013.01)

(58) Field of Classification Search
CPC . H02J 7/0047; H02J 7/0021; H02J 2007/005; G06F 1/3203; G06F 1/3212
USPC ............... 320/107, 114, 132, 149; 340/636.1, 340/636.12; 713/300, 324
See application file for complete search history.

(56) References Cited

U.S. PATENT DOCUMENTS

| | | | |
|---|---|---|---|
| 2006/0248363 A1* | 11/2006 | Chen ..................... | G06F 1/1616 713/300 |
| 2009/0119527 A1* | 5/2009 | Kim ....................... | G06F 1/3203 713/323 |
| 2010/0218021 A1 | 8/2010 | Ma et al. | |

FOREIGN PATENT DOCUMENTS

| | | |
|---|---|---|
| KR | 10-2002-0011238 A | 2/2002 |
| KR | 10-2003-0006290 A | 1/2003 |
| KR | 10-2008-0087493 A | 10/2008 |

* cited by examiner

*Primary Examiner* — Edward Tso
(74) *Attorney, Agent, or Firm* — The Farrell Law Firm, P.C.

(57) ABSTRACT

A portable electronic device is provided, and includes a function key that outputs a predetermined key signal; a key signal regulation unit that regulates a voltage of the predetermined key signal; a Power Management IC (PMIC) that powers on the portable electronic device and identifies a remaining amount of electric power of a battery when receiving the key signal of which a voltage is regulated by the key signal regulation unit in a power-off state; and a controller that controls to perform booting of the electronic device for displaying the remaining amount of electric power of the battery according to the power-on and to display the remaining amount of electric power of the battery.

13 Claims, 5 Drawing Sheets

PORTABLE ELECTRONIC DEVICE AND METHOD OF PROVIDING REMAINING AMOUNT OF ELECTRIC POWER OF BATTERY IN PORTABLE ELECTRONIC DEVICE

PRIORITY

This application claims priority under 35 U.S.C. §119(a) to Korean Application Serial No. 10-2013-0073676, which was filed in the Korean Intellectual Property Office on Jun. 26, 2013, the entire content of which is incorporated herein by reference.

BACKGROUND

1. Field of the Invention

The present invention generally relates to a portable electronic device and a battery.

2. Description of the Related Art

Portable electronic devices, also referred to portable terminals, include portable computers, portable phones, smart phones, and the like. In the portable electronic device, information on a remaining amount of electric power of a battery according to a charged/discharged state of the battery is important when a user uses the portable electronic device. For example, the remaining amount of electric power of the battery is needed for storing data being currently processed or protecting the portable electronic device from a battery charging state of a low level. Accordingly, today's various portable electronic devices attempt various methods in order to provide the information on the remaining amount of electric power of the battery to the user.

For example, when a user wants to identify a remaining amount of electric power of a battery mounted to the portable electronic device, a scheme is mainly used in which a portable electronic device is first powered off, and then the portable electronic device is powered on, and the remaining amount of electric power of the battery is then identified through a battery power identification function of the portable electronic device.

However, in this scheme, when a user wants to identify a remaining amount of electric power of an extra battery which is not mounted to the portable electronic device, the portable electronic device is first powered off, an already-mounted battery should be separated, the extra battery should be mounted, and then the portable electronic device is powered on again to be booted. At this time, the remaining amount of electric power of the extra battery is then identified when the booting is completed, so that a long time is spent and the entire manipulation is inconvenient to the user.

SUMMARY

The present disclosure has been made to address at least the above problems and disadvantages, and to provide at least the advantages described below.

Accordingly, an aspect of the present disclosure is to provide a portable electronic device and a method of providing information on a remaining amount of electric power of a battery in the portable electronic device, which conveniently identify the remaining amount of electric power of the battery in less time.

Another aspect of the present disclosure is to provide a portable electronic device and a method of providing information on a remaining amount of electric power of a battery in the portable electronic device, which identify the remaining amount of electric power of the battery by a simple key input after mounting of the battery, while not booting the entirety of the portable electronic device.

Another aspect of the present disclosure is to provide a portable electronic device and a method of providing information on a remaining amount of electric power of a battery in the portable electronic device, which provide the remaining amount of electric power of the battery according to a key input for identifying the remaining amount of electric power of the battery while the portable electronic device is not powered on by a power key thereof, by including a battery remaining amount identification key separately from the power key which powers on/off the portable electronic device.

In accordance with an embodiment of the present disclosure, a portable electronic device is provided. The portable electronic device includes a function key that outputs a predetermined key signal; a key signal regulation unit that regulates a voltage of the predetermined key signal; a Power Management IC (PMIC) that powers on the portable electronic device and identifies a remaining amount of electric power of a battery when receiving the key signal of which a voltage is regulated by the key signal regulation unit in a power-off state; and a controller that controls to perform booting of the electronic device for displaying the remaining amount of electric power of the battery according to the power-on and to display the remaining amount of electric power of the battery.

In accordance with an embodiment of the present disclosure, a method of providing a remaining amount of electric power of a battery in a portable electronic device is provided. The method includes receiving a key signal from a function key; determining whether a voltage level of the key signal received in a power-off state corresponds to a voltage level of a predetermined power-on/off signal; performing booting of the electronic device for identifying a remaining amount of a battery when the voltage level of the key signal does not correspond to the voltage level of the predetermined power-on/off signal; detecting the remaining amount of electric power of the battery according to the booting; and displaying information on the remaining amount of electric power of the battery.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE PRESENT INVENTION

Figure 1:
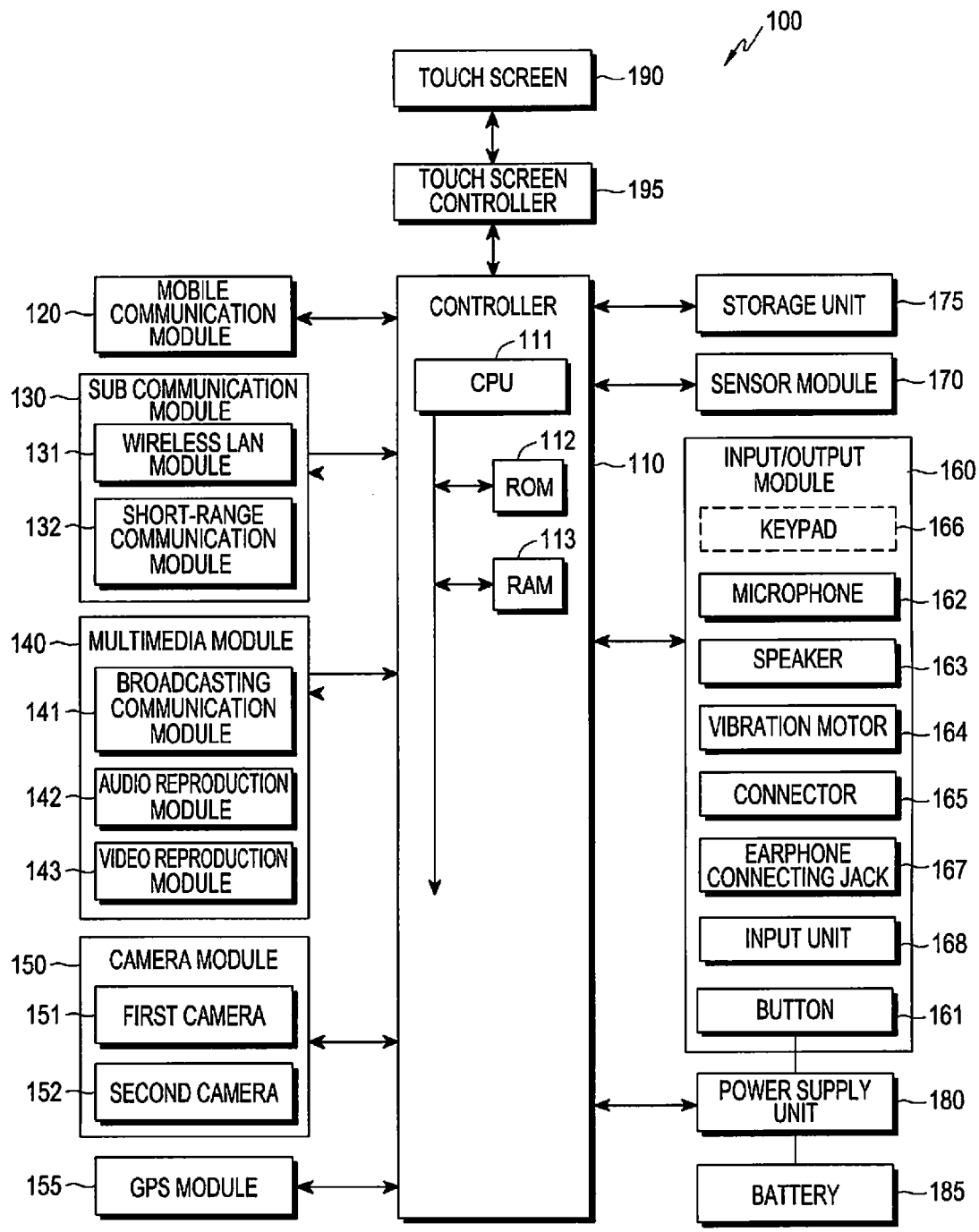
FIG. 1 is a block diagram schematically illustrating a portable electronic device according to an embodiment of the present disclosure.

Hereinafter, embodiments according to the present disclosure will be described in detail with reference to the accompanying drawings. However, the present disclosure is not limited to the embodiments. The same reference numerals represented in each of the drawings indicate elements that perform substantially the same functions.

FIG. 1 is a block diagram schematically illustrating a portable electronic device according to an embodiment of the present disclosure. Referring to FIG. 1, a portable electronic device 100 (hereinafter, also referred to as an "apparatus") may be connected to an external apparatus (not illustrated) using a mobile communication module 120, a sub-communication module 130, and a connector 165. The external apparatus may include another apparatus, a portable phone, a smart phone, a tablet PC, a server, and the like.

Referring to FIG. 1, the apparatus 100 includes a touch screen 190 and a touch screen controller 195. Further, the apparatus 100 includes a controller 110, a mobile communication module 120, a sub communication module 130, a multimedia module 140, a camera module 150, a GPS module 155, an input/output module 160, a sensor module 170, a power supply unit 180, and a storage unit 175. The sub communication module 130 includes at least one of a wireless Local Area Network (LAN) module 131 and a short range communication module 132, and the multimedia module 140 includes at least one of a broadcasting communication module 141, an audio reproduction module 142, and a video reproduction module 143. The camera module 150 includes at least one of a first camera 151 and a second camera 152. The input/output module 160 includes at least one of a button 161, a microphone 162, a speaker 163, a vibration motor 164, a connector 165, a keypad 166, an earphone connecting jack 167, and an input unit 168.

The controller 110 may include a Central Processing Unit (CPU) 111, a Read-Only Memory (ROM) 112 which stores a control program for controlling the apparatus 100, and a Random Access Memory (RAM) 113 which stores signals or data input from the outside of the apparatus 100, or is used as a storage region for operations performed by the apparatus 100. The CPU 111 may include a single core, a dual core, a triple core, or a quad core. The CPU 111, the ROM 112 and the RAM 113 may be connected to each other through internal buses.

The controller 110 controls the mobile communication module 120, the sub-communication module 130, the multimedia module 140, the camera module 150, the GPS module 155, the input/output module 160, the sensor module 170, the power supply unit 180, the storage unit 175, the touch screen 190, and the touch screen controller 195.

The mobile communication module 120 connects the external apparatus to the apparatus 100 through mobile communication by using one or more antennas under a control of the controller 110. The mobile communication module 120 may transmit/receive a voice call, a video call, a Short Message Service (SMS) or a Multimedia Message Service (MMS), and a wireless signal for video data transmission according to an embodiment of the present disclosure to/from a portable phone having the phone numbers input to the apparatus 100, a smart phone, a tablet PC or other apparatuses. The sub-communication module 130 includes at least one of the wireless LAN module 131 and the short-range communication module 132. For example, the sub-communication module 130 may include only the wireless LAN module 131, only the short-range communication module 132, or both the wireless LAN module 131 and the short-range communication module 132.

The wireless LAN module 131 may be connected to the Internet in a place in which a wireless Access Point (AP) is installed, under the control of the control unit 110. The wireless LAN module 131 supports a wireless LAN standard (IEEE802.11x) of the Institute of Electrical and Electronics Engineers (IEEE). The short-range communication module 132 may wirelessly perform short-range communication between the apparatus 100 and an image forming device under a control of the controller 110. The short distance communication scheme may include Bluetooth, Infrared Data Association (IrDA) communication, Near Field Communication (NFC), etc.

The apparatus 100 may include at least one of the mobile communication module 120, the wireless LAN module 131 and the short-range communication module 132 according to its performance. For example, the apparatus 100 may include a combination of the mobile communication module 120, the wireless LAN module 131 and the short-range communication module 132, according to its performance.

The multimedia module 140 includes the broadcasting communication module 141, the audio reproduction module 142 and the video reproduction module 143. The broadcasting communication module 141 receives a broadcasting signal (e.g., a TV broadcasting signal, a radio broadcasting signal or a data broadcasting signal) or additional broadcasting information (e.g., Electric Program Guide (EPS) or Electric Service Guide (ESG)) which are transmitted from a broadcasting station, through a broadcasting communication antenna, under the control of the controller 110. The audio reproduction module 142 reproduces a stored or received digital audio file (e.g., a file of which the file extension is mp3, wma, ogg, or way) under the control of the control unit 110. The video reproduction module 143 reproduces a stored or received digital video file (e.g., a file of which the file extension is mpeg, mpg, mp4, avi, mov, or mkv) under the control of the controller 110. The video reproduction module 143 may also reproduce a digital audio file.

The multimedia module 140 may include the audio reproduction module 142 and the video reproduction module 143 and not the broadcasting communication module 141. Further, the audio reproduction module 142 or the video reproduction module 143 of the multimedia module 140 may be included in the controller 110.

The camera module 150 includes at least one of the first camera 151 and the second camera 152 which photograph a still image or a moving image under the control of the controller 110. Further, the first camera 151 or the second camera 152 may include an auxiliary light source (e.g., a flash) that provides an amount of light required for photographing. The first camera 151 may be disposed on a rear surface of the apparatus 100, and the second camera 152 may be disposed on a front surface of the apparatus 100.

The GPS module 155 receives radio waves from a plurality of GPS satellites in the Earth's orbit and calculates a position of the apparatus 100 by using Time of Arrival from the GPS satellites to the apparatus 100. The input/output module 160 includes at least one of a plurality of buttons 161, the microphone 162, the speaker 163, the vibration motor 164, the connector 165, the keypad 166, the earphone connecting jack 167, and the input unit 168.

Figure 2A:
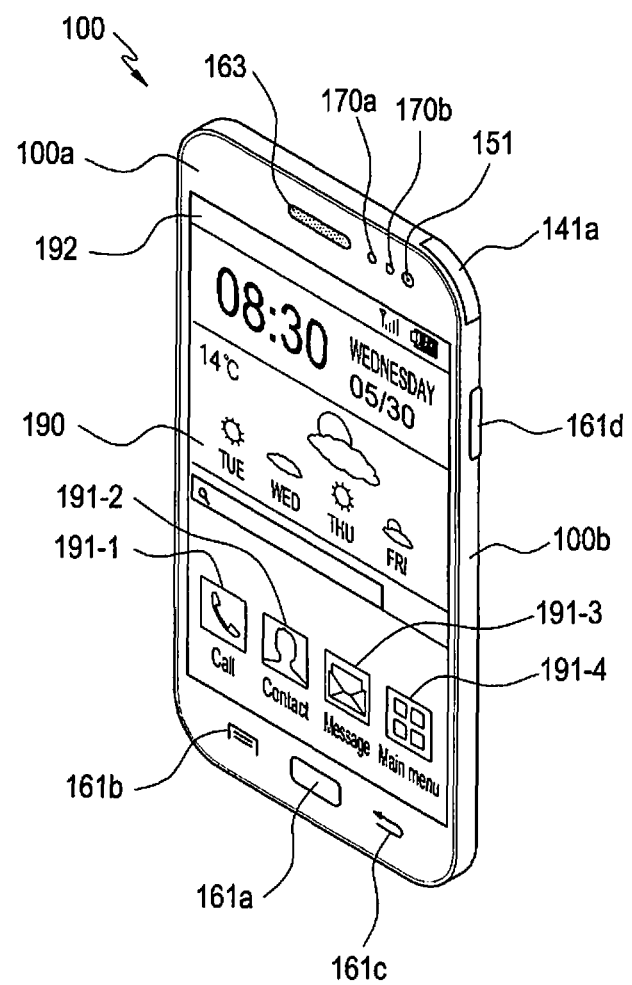
FIG. 2A is a front perspective view illustrating a portable electronic device according to an embodiment of the present disclosure.
Figure 2B:
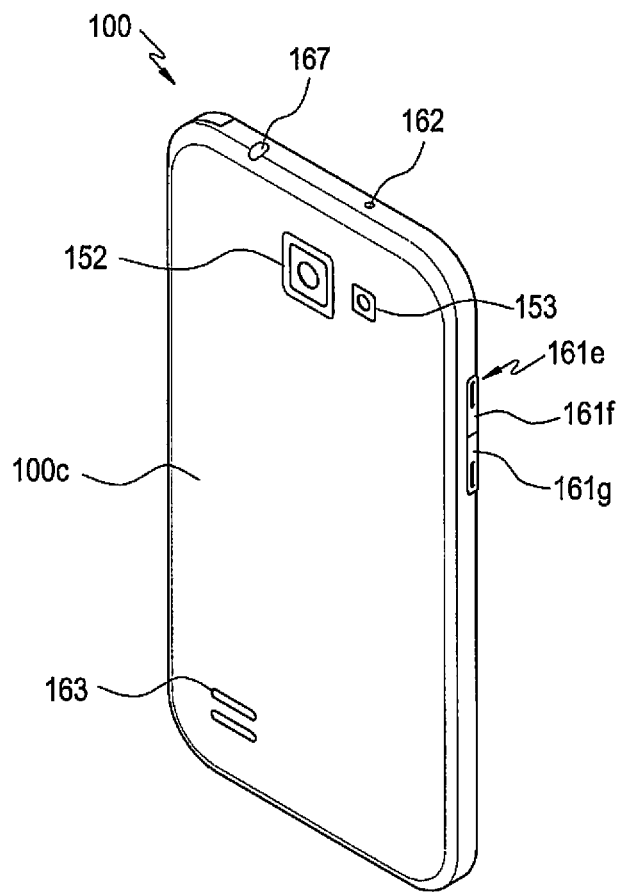
FIG. 2B is a rear perspective view illustrating a portable electronic device according to an embodiment of the present disclosure.

Referring to FIGS. 2A and 2B, the button 161 may be a "key", and may be formed on a front surface, a lateral surface or a rear surface of a housing of the apparatus 100. The button 161 may include at least one of a power button 161d (also, referred to as a "power key"), volume buttons 161e to 161g (also, referred to as a "volume key"), a menu button 161b (also, referred to as a "menu key"), a home button 161a (also, referred to as a "home key"), a back button 161c (also, referred to as a "back key") and a search button (also, referred to as a "search key").

The microphone 162 receives a voice or a sound to generate an electrical signal under the control of the controller 110.

The speaker 163 outputs sounds corresponding to various signals (e.g., a wireless signal, a broadcasting signal, a digital audio file, a digital video file, photographing, etc.) of the mobile communication module 120, the sub-communication module 130, the multimedia module 140 or the camera module 150 to the outside of the apparatus 100 under a control of the controller 110. The speaker 163 also outputs sounds (e.g., a button operation sound or a ringtone corresponding to a voice call) corresponding to functions which the apparatus 100 performs. One or more speakers 163 may be formed at a proper position or positions of the housing of the apparatus 100.

The vibration motor 164 converts an electronic signal into mechanical vibration under the control of the controller 110. For example, the apparatus 100 which stays in a vibration mode operates the vibration motor 164 when receiving a voice call from another device. One vibration motor 164 or a plurality of vibration motors 164 may be formed within the housing. The vibration motor 164 may operate in response to a touch operation of a user who touches the touch screen 190, and a continuous movement of a touch on the touch screen 190.

The connector 165 may be used as an interface which interconnects the mobile apparatus 100 and an external apparatus or a power source. The mobile apparatus 100 may transmit data stored in the storage unit 175 of the apparatus 100 to the external apparatus or receive data from the external apparatus through a wired cable connected to the connector 165 under the control of the control unit 110. The apparatus 100 may receive electric power from a power source or charge a battery, through the wired cable connected to the connector 165.

The keypad 166 receives a key input from a user in order to control the apparatus 100. The keypad 166 includes a physical keypad formed in the apparatus 100 or a virtual keypad displayed on the touch screen 190. The physical keypad formed on the apparatus 100 may be excluded according to the performance or structure of the apparatus 100.

An earphone is inserted into the earphone connecting jack 167 to be connected to the apparatus 100, and the input unit 168 may be inserted into and stored within the apparatus 100 and withdrawn or detached from the apparatus 100 when being used.

The sensor module 170 includes at least one sensor for detecting a status of the apparatus 100. For example, the sensor module 170 may include a proximity sensor which detects proximity of a user to the apparatus 100 or proximity of a finger, a pen, etc. to the screen, a illuminance sensor which detects an amount of light around the apparatus 100, an acceleration sensor which detects an operation (e.g., a rotation of the apparatus 100, acceleration or vibration applied to the apparatus 100) of the apparatus 100. At least one sensor may detect a status including the orientation and inclination of the apparatus 100, generate a signal corresponding to the detection, and transmit the signal to the controller 110. The sensors of the sensor module 170 may be added or omitted according to the performance of the apparatus 100.

The storage unit 175 stores signals or data which correspondingly input/output to an operation of the mobile communication module 120, the sub-communication module 130, the multimedia module 140, the camera module 150, the GPS module 155, the input/output module 160, the sensor module 170, and the touch screen 190 under the control of the controller 110. The storage unit 175 stores control programs and applications for controlling the apparatus 100 or the controller 110.

The term "storage unit" includes the storage unit 175, the ROM 112 in the controller 110, the RAM 113, or a memory card (e.g., an SD card and a memory stick) mounted to the apparatus 100. The storage unit may include a non-volatile memory, a volatile memory, a Hard Disc Drive (HDD) or a Solid State Drive (SSD).

The power supply unit 180 supplies electric power to a battery 185 disposed in the housing of the apparatus 100 under the control of the controller 110. The battery 185 may be one battery or a plurality of batteries. The battery 185 supplies electric power to the apparatus 100. In accordance with an embodiment of the present disclosure, the battery may be attached to or detached from the apparatus 100. Further, the power supply unit 180 may supply electric power input from an external electric power source through the wired cable connected to the connector 165 or electric power provided from the battery 185, to the apparatus 100.

The touch screen 190 provides a user with a User Interface (UI) corresponding to various services (e.g., a voice call, data transmission, broadcasting, and photographing). The touch screen 190 may transmit an analog signal corresponding to at least one touch input to the user interface, to the touch screen controller 195. The touch screen 190 can receive at least one touch through various objects, for example, body parts of a user (e.g. fingers) or a touchable input unit (e.g. a stylus pen). Further, the touch screen 190 may receive a continuous movement of one touch among at least one touch. The touch screen 190 may transmit an analog signal corresponding to the continuous movement of the touch input thereto, to the touch screen controller 195.

In the present disclosure, the touch is not limited to a contact between the touch screen 190 and the user's body or a touchable input means, and may include a non-contact hover. A distance of the non-contact hover detected by the touch screen 190 may be changed according to the performance or the structure of the apparatus 100. The touch screen 190 may be implemented, for example, in a resistive type, a capacitive type, an infrared type, an Electro Magnetic Resonance (EMR) type or an acoustic wave type, and also may be implemented in a combination of one or more of these types.

Further, the controller 110 may detect various user inputs received through the camera module 150, the input/output module 160, and the sensor module 170, in addition to the touch screen 190. The user input may include various types of information input into the device 100 such as a gesture, a voice, a pupil action, a bio signal, etc. of the user as well as the touch. The controller 110 controls a predetermined operation or function corresponding to the detected user's input to be performed within the apparatus 100.

FIG. 2A is a front perspective view illustrating a portable electronic device according to an embodiment of the present disclosure, and FIG. 2B is a rear perspective view illustrating a portable electronic device according to an embodiment of the present disclosure.

Referring to FIGS. 2A and 2B, the touch screen 190 is disposed in the center of the front surface 100a of the portable electronic device 100. The touch screen 190 may have a large size to occupy most of the front surface 100*a* of the portable electronic device 100. FIG. 2A illustrates an example where a main home screen is displayed on the touch screen 190. The main home screen is a first screen displayed on the touch screen 190 when power of the portable electronic device 100 is turned on. Further, when the portable electronic device 100 has different home screens of several pages, the main home screen is a first home screen among the home screens of several pages. Short-cut icons 191-1, 191-2, and 191-3 for executing frequently used applications, a main menu switching icon 191-4, time, weather, etc. may be displayed on the home screen. The main menu switching icon 191-4 displays a menu screen on the touch screen 190. At the top end of the touch screen 190, a status bar 192 may be formed that indicates the status of the apparatus 100 such as the battery charge status, the intensity of a received signal and current time.

The touch screen 190 has a home button 161*a*, a menu button 161*b* and a back button 161*c* which are arranged at a lower portion thereof.

The home button 161*a* displays the main home screen on the touch screen 190. For example, when the home key 161*a* is touched in a state where a home screen different from the main home screen or the menu screen is displayed on the touch screen 190, the main home screen is displayed on the touch screen 190. Further, when the home button 191*a* is touched while applications are executed on the touch screen 190, the main home screen illustrated in FIG. 2A is displayed on the touch screen 190. Further, the home button 161*a* may be used to display recently used applications or a task manager on the touch screen 190.

The menu button 161*b* provides a connection menu which may be displayed on the touch screen 190. The connection menu includes a widget addition menu, a background changing menu, a search menu, an editing menu, an environment setup menu, etc. The back button 161*c* can be used for displaying the screen which was executed just before the currently executed screen or terminating the most recently used application.

The first camera 151, an illumination sensor 170*a*, and a proximity sensor 170*b* may be disposed on edges of the front surface 100*a* of the portable electronic device 100. The second camera 152, a flash 153, and the speaker 163 may be disposed on a rear surface 100*c* of the apparatus 100.

For example, a power button 161*d*, a volume button 161*e* to 161*g* (referred to as a "volume key"), a terrestrial Digital Multimedia Broadcasting (DMB) antenna 141*a* for receiving broadcasting, one microphone 162 or a plurality of microphones 162, etc. may be disposed at a lateral side 100*b* of the portable electronic device 100. The DMB antenna 141*a* may be formed to be fixed to or detachable from the portable electronic device 100.

Further, the connector 165 is formed on a lower side surface of the portable electronic device 100. A plurality of electrodes is formed in the connector 165, and the connector 165 may be wiredly connected to an external device. The earphone connecting jack 167 may be formed on an-upper side surface of the electronic device 100. An earphone may be inserted into the earphone connecting jack 167.

Further, the input unit 168 may be formed on a lower side surface of the portable electronic device 100. The input unit 168 may be inserted into the portable electronic device 100 to be stored in the electronic device 100, and withdrawn and detached from the portable electronic device 100 when being used.

In accordance with an embodiment of the present disclosure, the above-configured portable electronic device 100 is powered on and performs booting when receiving an input signal of the power key 161*d* as the power key 161*d* is pressed in a state in which the portable electronic device 100 is powered off. The booting implies starting of the portable electronic device 100, and corresponds to an operation in which the controller 110 uses the storage unit 175 to read an Operating System (OS) in the system in order to operate the portable electronic device 100. That is, the booting implies starting or initial setting of an overall system of the portable electronic device. When the portable electronic device 100 is powered on, a booting program is read by the controller 110, and the booting program is executed by the controller 110 and prepares to operate the portable electronic device 100 by reading the OS (e.g., Android OS, iOS, etc.) of the portable electronic device 100 in the storage unit 175. As the booting is performed, the portable electronic device 100 performs an overall function and an overall operation thereof. For example, as the booting is performed, the portable electronic device 100 may identify a remaining amount of electric power of the battery 185 and display the remaining amount of electric power of the battery 185 on the status bar 192 on the touch screen 190, through the controller 110.

However, in this way of the conventional art, the operation of displaying the remaining amount of electric power of a first battery 185*a* after the portable electronic device 100 is powered on and the booting is completed is inconvenient when a user wants to identify the remaining amount of electric power of a second battery 185*b* in a state where the second battery 185*b* is not mounted to the portable electronic device 100. For example, when a user wants to identify the remaining amount of electric power of the second battery 185*b* not mounted to the portable electronic device 100 in a state where the first battery 185*a*, which is not the second battery 185*b* of which the remaining amount of electric power is required to be identified by the user, is mounted to the portable electronic device 100, if the portable electronic device 100 is powered on, the user must power off the portable electronic device 100, then separate the already-mounted first battery 185*a* from the portable electronic device 100, mount the second battery 185*b*, power on the portable electronic device 100 and entirely boot the portable electronic device 100, and then identify the remaining amount of electric power of the second battery 185*b*. This operation takes long time and is very inconvenient to the user.

Thus, in an embodiment of the present disclosure, the portable electronic device 100 is not entirely booted but boots in a mode for identifying the remaining amount of electric power of the second battery 185*b* according to a predetermined key signal, so that only a minimal booting is performed, and information on the remaining amount of electric power of the second battery 185*b* is more rapidly provided by identifying the remaining amount of electric power of the second battery 185*b* according to the minimal booting, as compared with the entire booting.

In an embodiment of the present disclosure, an operation of performing entire booting for an overall operation of the portable electronic device 100 refers to the entire booting, and an operation of performing minimal booting for providing the information on the remaining amount of electric power of the second battery 185*b* refers to the minimal booting.

For example, the portable electronic device 100 includes a circuit region which operates according to situations in order to optimize power consumption. The entire booting may involve booting for operating all the circuit region of the portable electronic device 100, and the minimal booting may involve booting for operating only a predetermined minimal circuit region of the portable electronic device. For example, the minimal booting includes booting in which only a circuit region displaying the information on the remaining amount of the battery is powered on. The circuit region displaying the information on the remaining amount of electric power of the battery includes the controller 110 calculating the information on the remaining amount of electric power of the battery, and a display unit displaying the information on the remaining amount of the battery, i.e. the touch screen controller 195 and the touch screen 190.

Figure 3:
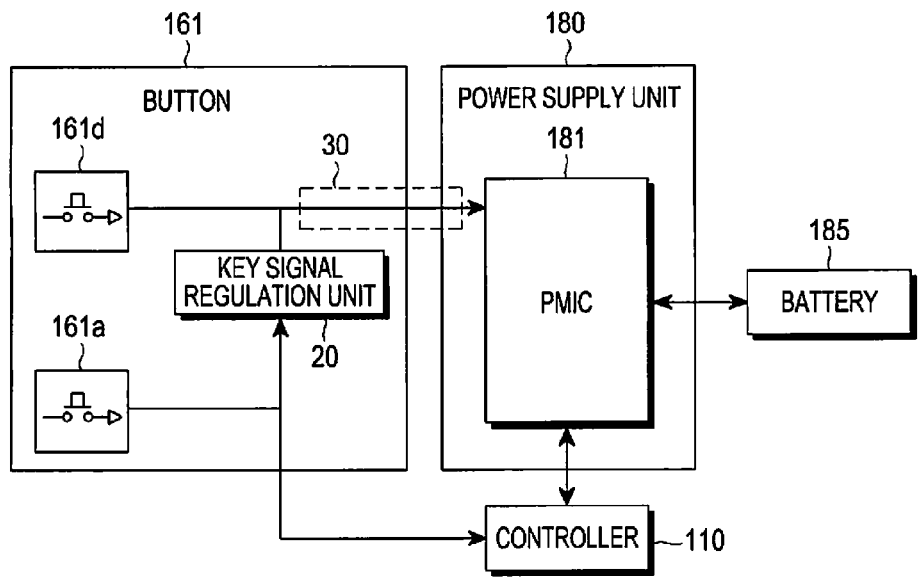
FIG. 3 illustrates a configuration for providing information on a remaining amount of electric power of a battery in a portable electronic device according to an embodiment of the present disclosure.

In a description of a configuration of the present disclosure for the minimal booting, FIG. 3 illustrates a configuration for providing information on a remaining amount of electric power of a battery in a portable electronic device 100 according to an embodiment of the present disclosure.

Referring to FIG. 3, the button 161 includes the power key 161d and various types of function keys. As described above, the various types of function keys implies the home key 161a, the menu key 161b, the back key 161c, and the volume keys 161e to 161g. Further, the button 161 may include keys for other functions which are not mentioned herein.

In accordance with an embodiment of the present disclosure, one of the various function keys may be used as a battery power identification key for receiving the information on the remaining amount of electric power of the battery. In an embodiment of the present disclosure, the use of the home key 161a as the battery power identification key for receiving the information on the remaining amount of electric power of the battery will be described herein below.

Figure 4:
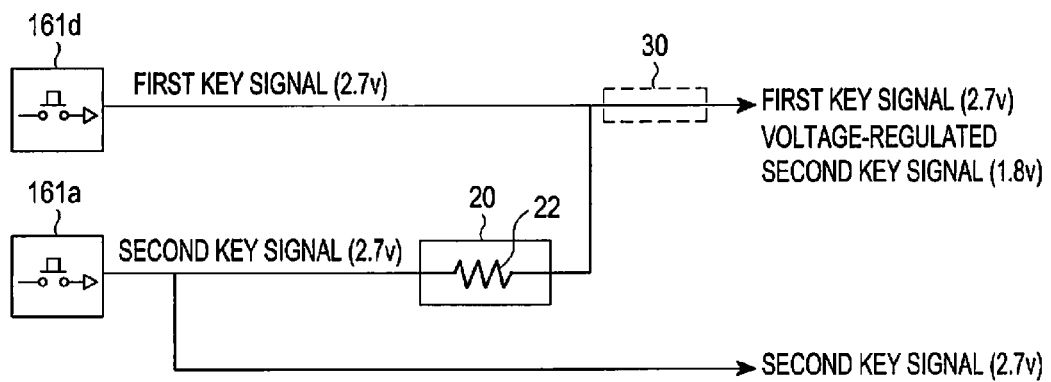
FIG. 4 is a conceptual view illustrating an input of a key signal by a power key and a home key according to an embodiment of the present disclosure.

FIG. 4 is a conceptual view illustrating input of a key signal by the power key 161d and the home key 161a, according to an embodiment of the present disclosure.

Referring to FIGS. 3 and 4, the power key 161d (hereinafter, referred to as a "first key") outputs a power key signal (hereinafter, referred to as a "first key signal") when a user presses the power key 161d. The first signal may be, for example, a signal of a predetermined voltage (2.7V), and may be input to a Power Management IC (PMIC) 181.

The home key 161a outputs a home key signal (hereinafter, referred to as a "second key signal") when a user presses the home key 161a (hereinafter, referred to as a "second key"). The second signal may be, for example, a signal of a predetermined voltage (2.7V), and may be input to a key signal regulation unit 20 and the controller 110.

The key signal regulation unit 20 may be configured by a divider circuit receives the second key signal, and regulates and outputs a voltage of the second key signal. For example, the key signal regulation unit 20 may regulate the voltage of the second key signal to 1.8 V and output the regulated voltage when the voltage of the second key signal is 2.7 V. The second key signal of which the voltage is regulated is input to the PMIC 181. When the key signal regulation unit 20 is configured by the divider circuit, the divider circuit includes a resistor element 22 for reducing the voltage of the second key signal to a predetermined voltage. At this time, the resistor element 22 may be any element having a resistant component. The PMIC 181 may be included in the power supply unit 180, performs power-on in a power-off state, and performs power-off in the power-on state.

The PMIC 181 receives the first key signal (2.7 V) and the second key signal (1.8 V) of which the voltage is regulated, through one line 30. The PMIC 181 performs power-on in a power-off state to perform the entire booting for the overall operation of the portable electronic device 100 when receiving the first key signal (2.7 V). Alternatively, the PMIC 181 may perform power-off in a power-on state when receiving the first key signal (2.7 V).

Further, the PMIC 181 may perform power-on in a power-off state to perform the minimal booting for providing the information on the remaining amount of the battery.

The controller 110 may receive the first key signal (2.7 V) via the PMIC 181 and the second key signal (2.7 V). When the power of the portable electronic device 100 is turned on by the PMIC 181 as the first key signal is received in a power-off state, the controller 110 performs the entire booting for the overall operation of the portable electronic device 100. When receiving the first key signal in a power-on state, the controller 110 terminates power to the portable electronic device 100 and requests the PMIC 181 to perform power-off.

Further, when the power of the portable electronic device 100 is turned on by the PMIC 181 as the second key signal is received in a power-off state, the controller 110 performs the minimal booting for providing the information on the remaining amount of electric power of the battery. As the minimal booting for providing the information on the remaining amount of electric power of the battery is performed, the controller 110 performs a control to receive the information on the remaining amount of the battery identified through the PMIC 181, and displays the information on the remaining amount of electric power of the battery on the touch screen 190. At this time, when receiving the second key signal in a state of power-on, the controller 110 performs an original function according to the second key signal. For example, the controller 110 may perform a control to perform a function according to the home key signal.

In accordance with the embodiment of the present disclosure, the portable electronic device 100 does not perform the entire booting but performs the minimal booting for identifying the remaining amount of electric power of the battery according to the predetermined regulated second key signal, in order to provide the remaining amount of electric power of the battery, so as to more rapidly provide the information on the remaining amount of the battery as compared with the entire booting.

Figure 5:
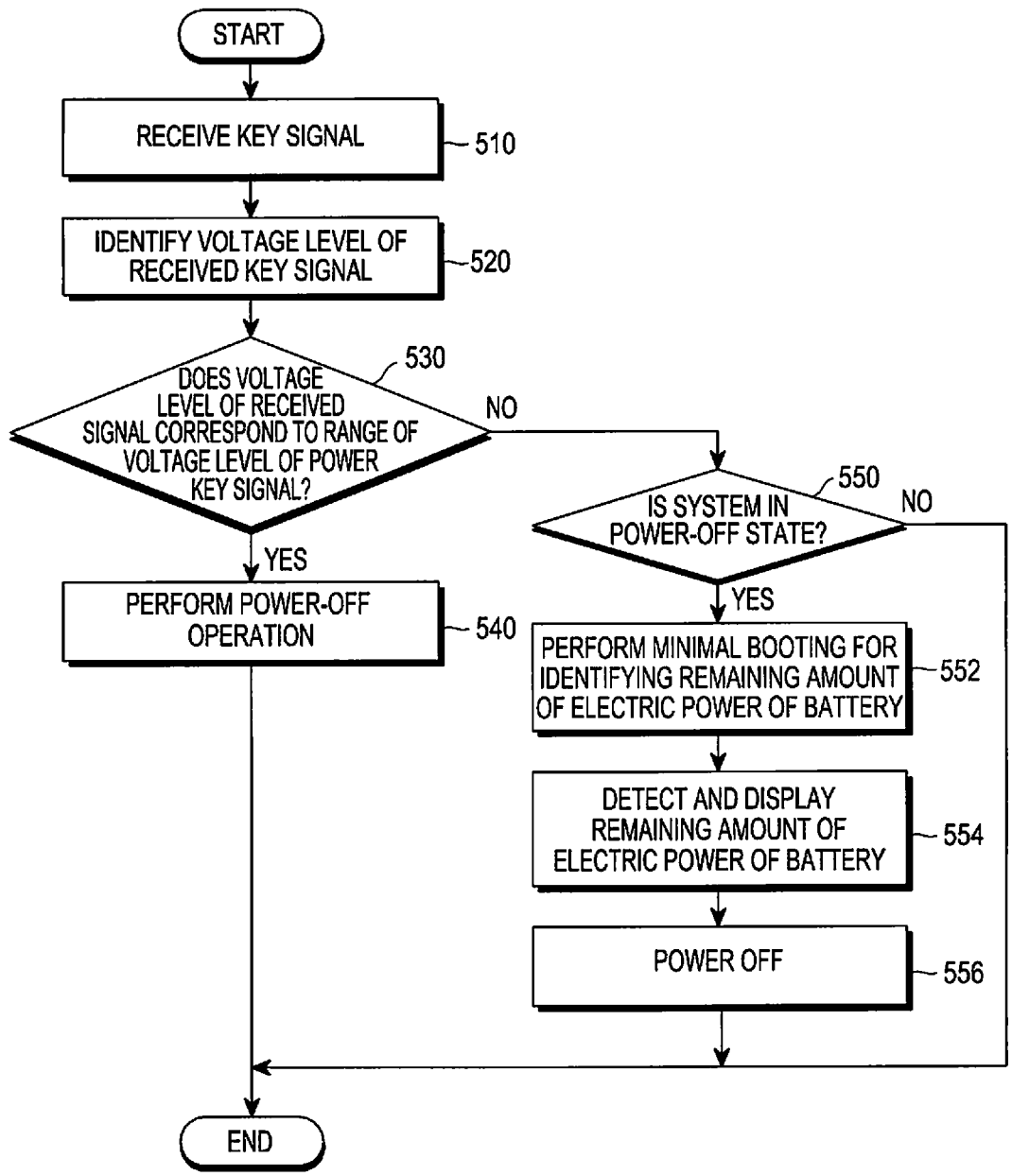
FIG. 5 is a flowchart illustrating an operation of a portable electronic device according to an embodiment of the present disclosure.

In a description of an operation of the portable electronic device 100 according to the embodiment of the present disclosure, FIG. 5 is a flowchart illustrating an operation of a portable electronic device 100.

Referring to FIG. 5, the portable electronic device 100 receives a key signal through a port of the PMIC 181, in step 510. The PMIC 181 may receive the first key signal and the second key signal of which the voltage is regulated, through one port or one line 30.

When receiving the key signal, the portable electronic device 100 identifies a voltage level of the key signal received through the PMIC 181, in step 520. When the received key signal is the first key signal, the voltage level may be 2.7 V, and when the received key signal is the second key signal of which the voltage is regulated, the voltage level may be 1.8 V.

The portable electronic device 100 determines whether the voltage level of the received key signal corresponds to a range of a voltage level of a predetermined power-on/off signal, in step 530.

When the voltage level of the received key signal corresponds to the range of the voltage level of the predetermined power-on/off signal, the portable electronic device 100 performs a power on/off operation, in step 540. For example, when the voltage of the received key signal corresponds to the range of the voltage level of the predetermined power-on signal in a power-off state, the portable electronic device 100 is powered on, and when the voltage of the received key signal corresponds to the range of the voltage level of the predetermined power-off signal in a power-on state, the portable electronic device 100 is powered off.

In step 530, when the voltage level of the received key signal does not correspond to the range of the voltage level of the predetermined power-on/off signal, the portable electronic device 100 determines whether it is in a power-off state, in step 550. When being in a power-off state, the portable electronic device 100 performs the minimal booting for displaying the remaining amount of electric power of the battery, in step 552.

After the minimal booting, the portable electronic device 100 detects the remaining amount of electric power of the battery 185 through the PMIC 181, and displays the detected remaining amount of electric power of the battery 185 on the touch screen 190 in step 554. After displaying the remaining amount of electric power of the battery, the portable electronic device 100 is powered off, in step 556.

Meanwhile, although an example where one key among various function keys, for example, the home key 161a, is used as a battery remaining amount display key for receiving the information on the remaining amount of electric power of the battery is described in the aforementioned embodiment of the present disclosure, in accordance with another embodiment, a separate, dedicated battery remaining amount display key (not illustrated) for displaying the remaining amount of electric power of the battery may be provided and the remaining amount of electric power of the battery may be displayed according to an input of the battery remaining amount display key. Further, in accordance with another embodiment of the present disclosure, an additional booting circuit for displaying the remaining amount of electric power of the battery may be included separately from the controller 110.

In accordance with various embodiments of the present disclosure, the portable electronic device rapidly notifies a user of the remaining amount of electric power of the battery, so that the user conveniently identifies the information on the remaining amount of electric power of the battery.

Further, in accordance with embodiments of the present disclosure, the portable electronic device does not perform the entire booting but instead performs the minimal booting for identifying the remaining amount of electric power of the battery according to the predetermined regulated key signal, in order to provide the remaining amount of electric power of the battery, so as to more rapidly provide the information on the remaining amount of electric power of the battery, as compared with the entire booting.

The methods according to embodiments of the present disclosure may be implemented in a form of program commands executed through various computer means to be recorded in a computer readable medium. The computer readable medium may include a program command, a data file, a data structure, etc. independently or in combination. The program command recorded in the computer-readable medium may be one which is specifically designed and configured for the present disclosure, or may be well-known to and used by those skilled in the art of computer software.

It can be seen that the method of providing the remaining amount of electric power of the battery according to embodiments of the present disclosure may be implemented in a form of hardware or software or a combination of hardware and software. Any such software may be stored, for example, in a volatile or non-volatile storage device such as a ROM, a memory such as a RAM, a memory chip, a memory device, or an IC, or an optical or magnetic recordable and machine (e.g., computer) readable medium such as a CD, a DVD, a magnetic disk, or a magnetic tape, regardless of its ability to be erased or its ability to be re-recorded. The method of providing the remaining amount of electric power of the battery according to embodiments of the present disclosure can be realized by a computer or a portable electronic device including a controller and a memory, and it can be seen that the memory corresponds to an example of the machine readable storage medium which is suitable for storing a program or programs including instructions by which the embodiments of the present disclosure are realized. Accordingly, the present disclosure includes a program including a code for implementing the apparatus or the method defined in the appended claims of the present specification and a machine (computer, etc.)-readable storage medium for storing the program. Further, the program may be electronically transferred by a predetermined medium such as a communication signal transferred through a wired or wireless connection, and the present disclosure appropriately includes equivalents of the program.

Further, the portable electronic device according to an embodiment of the present disclosure may receive the program from a program providing apparatus connected wiredly or wirelessly and store the program. The program providing apparatus may include a memory for storing a program including an instruction which performs the method of providing the remaining amount of electric power of the battery, a communication unit for performing wired or wireless communication with the battery information providing apparatus, and a controller for performing a control to transmit the corresponding program through the communication unit in response to a request of the battery information providing apparatus or automatically.

While the disclosure has been shown and described with reference to certain embodiments thereof, it will be understood by those skilled in the art that various changes in form and detail may be made therein without departing from the spirit and scope of the disclosure as defined by the appended claims and their equivalents.

What is claimed is:

1. A portable electronic device comprising:
   a function key configured to output a predetermined key signal;
   a key signal regulation unit configured to regulate a voltage of the predetermined key signal;
   a Power Management IC (PMIC) configured to power on the portable electronic device and identify a remaining amount of electric power of a battery when receiving the predetermined key signal of which the voltage is regulated by the key signal regulation unit in a power-off state; and
   a controller configured to perform booting of the electronic device for displaying the remaining amount of electric power of the battery according to the power-on and to display the remaining amount of electric power of the battery.

2. The portable electronic device of claim 1, further comprising a display unit that displays information on the remaining amount of electric power of the battery.

3. The portable electronic device of claim 1, wherein the key signal regulation unit comprises a divider circuit.

4. The portable electronic device of claim 3, wherein the divider circuit comprises a resistor that decreases the voltage of the predetermined key signal to a value lower than a predetermined value.

5. The portable electronic device of claim 1, wherein the function key is at least one of a home key, a menu key, a back key and a volume key.

6. The portable electronic device of claim 1, wherein the function key is a separate, dedicated battery remaining amount display key.

7. The portable electronic device of claim 1, wherein when the PMIC receives the predetermined key signal in the power-on state, the controller performs a function corresponding to the predetermined key signal.

8. A method of providing a remaining amount of electric power of a battery in a portable electronic device, the method comprising:
- receiving a key signal from a function key;
- determining whether a voltage level of the key signal received in a power-off state corresponds to a voltage level of a predetermined power-on/off signal;
- performing booting of the electronic device for identifying a remaining amount of electric power of a battery when the voltage level of the key signal does not correspond to the voltage level of the predetermined power-on/off signal;
- detecting the remaining amount of electric power of the battery according to the booting; and
- displaying information on the remaining amount of electric power of the battery.

9. The method of claim 8, further comprising performing a power-on/off operation when the voltage level of the received key signal corresponds to the voltage level of the predetermined power-on/off signal.

10. The method of claim 8, further comprising powering off the portable electronic device after displaying the information on the remaining amount of electric power of the battery.

11. The method of claim 8, wherein a function corresponding to the key signal is performed when the key signal is received in a power-on state.

12. The method of claim 8, wherein the function key is at least one of a home key, a menu key, a back key and a volume key.

13. The method of claim 8, wherein the function key is a separate, dedicated battery remaining amount display key.

* * * * *